H. T. Smith,
Ladder.
No. 66,179.  Patented June 25, 1867.
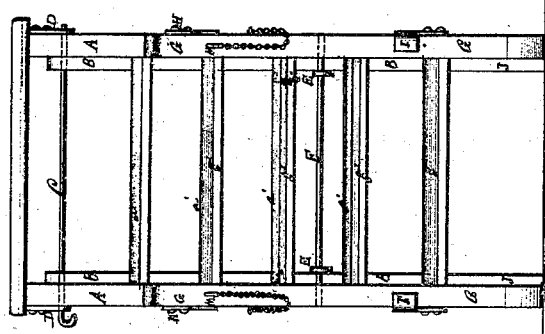
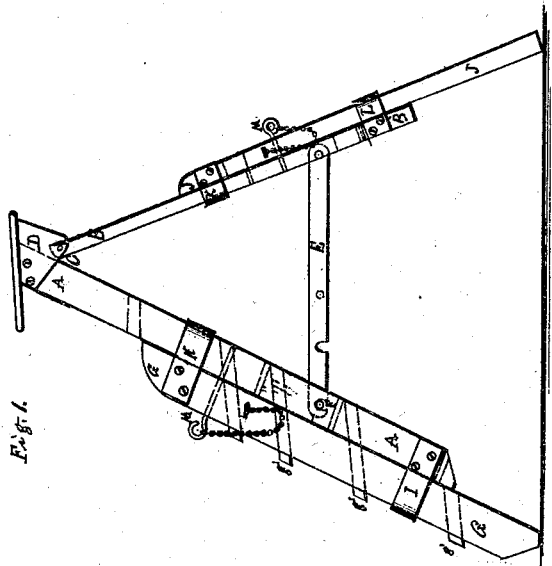

United States Patent Office.

HENRY T. SMITH, OF BROOKLYN, NEW YORK.

Letters Patent No. 66,179, dated June 25, 1867.

IMPROVED STEP-LADDER.

The Schedule referred to in these Letters Patent and making part of the same.

TO ALL WHOM IT MAY CONCERN:

Be it known that I, HENRY T. SMITH, of 183 Fulton street, Brooklyn, Kings county, New York, have invented a new and improved Extension Step-Ladder; and I do hereby declare that the following is a full, clear, and exact description thereof, which will enable others skilled in the art to make and use the same, reference being had to the accompanying drawings, forming part of this specification, in which—

Figure 1 is a side view of my improved extension step-ladder.

Figure 2 is a front view of the same.

Similar letters of reference indicate corresponding parts.

My invention has for its object to furnish an improved step-ladder, so constructed and arranged that it may be extended, when desired, to adapt it for use in rooms with different heights of ceiling, and so that one part may be extended independently of the other to adapt it for use upon a stairway; and it consists in the combination of the extension parts and guide straps with the ordinary parts of a step-ladder, and in the combination of a hook-frame with the ordinary parts of a step-ladder; the whole being constructed and arranged as hereinafter more fully described.

A is the part of an ordinary step-ladder to which the steps $a'$ are attached. B is the brace or supporting frame, the upper end of which is pivoted to the upper end of the part A by the rod C passing through holes in the upper ends of the side-bars of said frame, and through the ears D attached to the upper ends of the side-bars of the said part A. E is the hook-frame, the rear ends of the side-bars of which are pivoted to the inner sides of the lower parts of the side-bars of the supporting-frame B. The side-bars of the hook-frame E, which are rigidly connected to each other by one or more cross-bars, have notches formed in their lower edge which hook upon the rod F passing through the side-bars of the part A, as shown in figs. 1 and 2, so that the lower parts or feet may be spread further apart or drawn closer together, as may be required. G is the extension part to which steps $g'$ are attached similar to and at the same distance apart, as the steps of the part A. The side-bars of the part G slide up and down upon the side-bars of the part A, and are kept in place by the straps H and I. The straps H are secured to the upper ends of the side-bars of the part G, and they are bent around the inner edges of the side-bars of the part A. In the same manner the straps I are attached to the lower ends of the side-bars of the part A, and are bent around the outer edges of the side-bars of the part G. This construction keeps the edges of the side-bars of the parts A and G closely in contact as the extension part G is moved up and down. The extension part J of the supporting-frame B is connected to the said frame B by the straps K and L, constructed and arranged in the same manner as the straps H and I. The extension parts G and J are secured in any position in which they may be placed by pins M passing in through holes in the side-bars of the parts G and J, and into one or the other of the holes in the side-bars of the parts A and B, as shown in figs. 1 and 2.

By this construction and arrangement of the parts the ladder may be adjusted at any desired height; or, it may be so adjusted as to stand upon a flight of steps without its being necessary to build a scaffold to support the feet of the ladder.

What I claim as new, and desire to secure by Letters Patent, is—

The combination of the extension parts G and J, and guide straps H I K L, with the ordinary parts A and B of a step-ladder, substantially in the manner herein shown and described and for the purpose set forth.

The above specification of my invention signed by me this 13th day of April, 1867.

HENRY T. SMITH.

Witnesses:
WM. F. MCNAMARA,
JAMES T. GRAHAM.